(12) United States Patent
Mueller

(10) Patent No.: US 12,192,867 B2
(45) Date of Patent: Jan. 7, 2025

(54) LOCATION-AWARE SOFTWARE DEFINED ANTENNA MANAGEMENT

(71) Applicant: Dell Products, L.P., Round Rock, TX (US)

(72) Inventor: Julius Mueller, Santa Cruz, CA (US)

(73) Assignee: Dell Products, L.P., Round Rock, TX (US)

( * ) Notice: Subject to any disclaimer, the term of this patent is extended or adjusted under 35 U.S.C. 154(b) by 312 days.

(21) Appl. No.: 17/648,252

(22) Filed: Jan. 18, 2022

(65) Prior Publication Data

US 2023/0232194 A1 Jul. 20, 2023

(51) Int. Cl.
| | |
|---|---|
| *H04B 7/00* | (2006.01) |
| *G06N 20/00* | (2019.01) |
| *H04W 4/024* | (2018.01) |
| *H04W 4/029* | (2018.01) |
| *H04W 4/44* | (2018.01) |
| *H04W 88/06* | (2009.01) |

(52) U.S. Cl.
CPC .............. *H04W 4/44* (2018.02); *G06N 20/00* (2019.01); *H04W 4/024* (2018.02); *H04W 4/029* (2018.02); *H04W 88/06* (2013.01)

(58) Field of Classification Search
CPC ......... H04W 4/02; H04W 4/023; H04W 4/44; H04W 4/024; H04W 4/029; H04W 4/30; H04W 4/46; G06N 20/00
See application file for complete search history.

(56) References Cited

U.S. PATENT DOCUMENTS

| | | | |
|---|---|---|---|
| 2004/0180650 A1* | 9/2004 | Kamemura | H04B 7/2609 455/432.1 |
| 2021/0061306 A1* | 3/2021 | Dagan | B60W 60/0013 |
| 2022/0052724 A1* | 2/2022 | Kim | H04B 1/3822 |

OTHER PUBLICATIONS

International Search Report and Written Opinion received for PCT Application Serial No. PCT/US2022/053048 dated Mar. 27, 2023, 18 pages.
Wang et al.,"MmWave Vehicular Beam Selection With Situational Awareness Using Machine Learning", IEEE Access, vol. 09, Jun. 10, 2019, 15 pages.
Klautau et al.,"5G MIMO Data for Machine Learning: Application to Beam-Selection using Deep Learning", IEEE, 2018, 9 pages.
International Preliminary Report on Patentability received for PCT Application Serial No. PCT/US2022/053048 dated Aug. 2, 2024, 12 pages.
European Office Action mailed Aug. 27, 2024 for European Patent Application No. 22847353.4, 3 pages.

* cited by examiner

*Primary Examiner* — Tuan Pham
(74) *Attorney, Agent, or Firm* — Amin, Turocy & Watson, LLP

(57) ABSTRACT

Location-aware software defined antenna management is described herein. A method as described herein can include generating, by a system comprising a processor, positioning data associated with movement of a vehicle, associated with the system, through an environment; obtaining, by the system from network equipment of a communication network operating in the environment, network data associated with the communication network; and altering, by the system, a configuration of antennas, associated with the vehicle, from a first configuration to a second configuration, distinct from the first configuration, based on the positioning data and the network data.

20 Claims, 13 Drawing Sheets ved with the communication network; and facilitating reconfiguration of an antenna system, associated with the vehicle, from a first antenna configuration to a second antenna configuration, distinct from the first antenna configuration, based on the tracking data and the network data.

LOCATION-AWARE SOFTWARE DEFINED ANTENNA MANAGEMENT

BACKGROUND

Vehicle-to-everything (V2X) refers to communications between a vehicle and other entities that can interact with the vehicle during travel. V2X encompasses multiple types of vehicular communication, such as vehicle-to-vehicle (V2V), vehicle-to-pedestrian (V2P), vehicle-to-infrastructure (V2I), and vehicle-to-network (V2N). Incorporating these and/or other types of vehicular communication into a single V2X system can result in improvements in vehicle safety and traffic efficiency, among other benefits. Presently, multiple technologies exist for V2X communication. One such technology is Institute of Electrical and Electronics Engineers (IEEE) 802.11p, which is based on wireless local area network (WLAN) technology. Another V2X technology is Cellular V2X (C-V2X), which is based on cellular communication technology.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a vehicle communication system is described herein. The system can include antennas configured according to a first antenna configuration, a memory that stores executable components, and a processor that executes the executable components stored in the memory. The executable components can include a position location component that generates positioning data corresponding to movement of a vehicle, associated with the vehicle communication system, through an environment. The executable components can also include a network monitor component that obtains, from network equipment of a communication network operating in the environment, network data associated with the communication network. The executable components can further include an antenna configuration component that causes the antennas to be configured according to a second antenna configuration, instead of the first antenna configuration, based on the positioning data and the network data.

In another implementation, a method is described herein. The method can include generating, by a system including a processor, positioning data associated with movement of a vehicle, associated with the system, through an environment. The method can further include obtaining, by the system from network equipment of a communication network operating in the environment, network data associated with the communication network. The method can additionally include altering, by the system, a configuration of antennas, associated with the vehicle, from a first configuration to a second configuration, distinct from the first configuration, based on the positioning data and the network data.

In an additional implementation, a non-transitory machine-readable medium including computer executable instructions is described herein. The instructions, when executed by a processor of a vehicular communication system, can facilitate performance of operations including generating tracking data corresponding to a location of a vehicle, associated with the vehicular communication system, within an environment during a time interval; receiving, from equipment associated with a communication network operating in the environment, network data associated with the communication network; and facilitating reconfiguration of an antenna system, associated with the vehicle, from a first antenna configuration to a second antenna configuration, distinct from the first antenna configuration, based on the tracking data and the network data.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
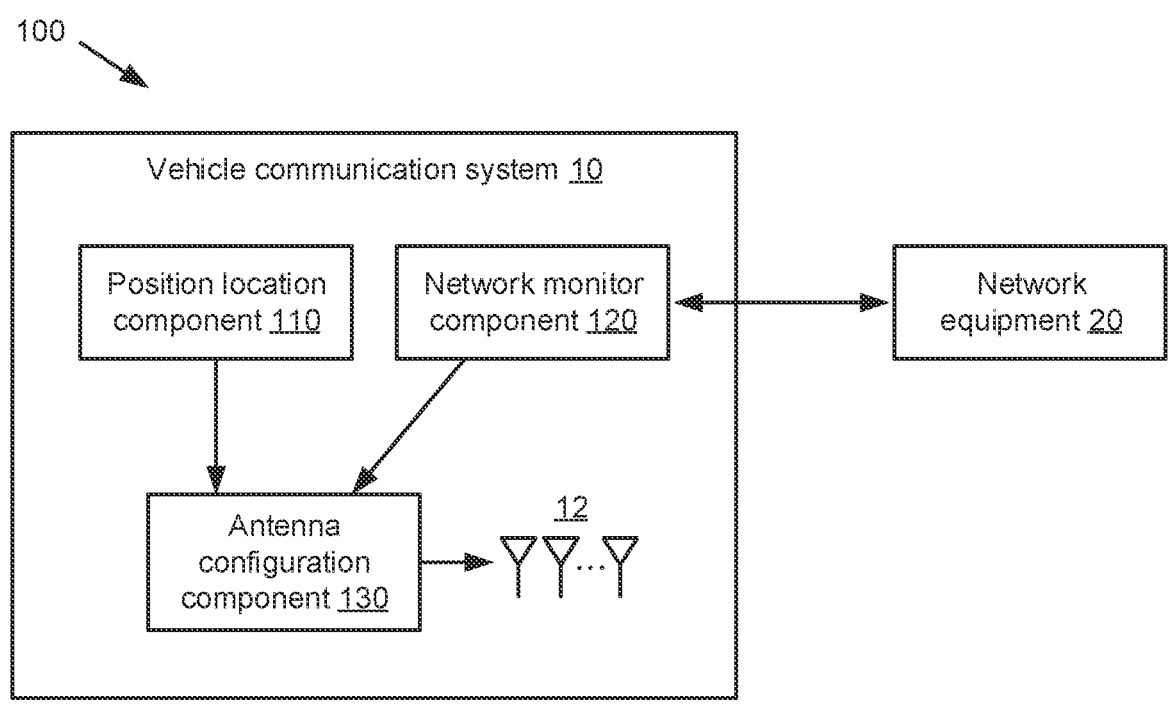
FIG. 1 is a block diagram of a system that facilitates location-aware software defined antenna management in accordance with various implementations described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Various implementations described herein facilitate location-aware software defined antenna management, e.g., for a V2X-capable vehicle communication system. For instance, a vehicle communication system as described herein can collect location data corresponding to an associated vehicle, e.g., as the vehicle is in motion. The vehicle communication system can then combine the location data with other data, such as data associated with nearby network equipment, to facilitate dynamic configuration of the system. By way of example, a vehicle communication system can use gathered data as described herein to adjust or alter the configuration of associated antennas, e.g., with respect to a V2X technology (e.g., 802.11p, C-V2X, etc.) in which the antennas operate, a frequency band or other resources in which the antennas are configured to operate, or the like. While various example implementations provided herein relate to specific radio access technologies, interfaces, etc., it is noted that other radio access technologies, interfaces, etc., could also be used. Unless explicitly stated otherwise, the following description and claimed subject matter are not intended to be limited to any specific radio access technology, interfaces, or other aspects.

As noted above, two major technology trends have emerged for V2X communication: 802.11p, which is based on the IEEE 802.11 (Wi-Fi) standard, and C-V2X. While both of these technologies can operate in the same wireless spectrum (e.g., spectrum associated with the 5.9 GHz band), the two technologies are neither interoperable or compatible with each other due to fundamental differences between the two technologies. As a result, a vehicle utilizing 802.11p for V2X communication cannot communicate with another vehicle utilizing C-V2X for V2X communication.

It would generally be desirable to deploy only a single V2X technology, e.g., either 802.11p or C-V2X, in order to reduce implementation costs, minimize potential attack vectors, increase interoperability across automotive companies, and/or to realize other benefits. However, due to conflicts at various levels of the implementation chain (e.g., automobile manufacturers, mobile network operators, national governmental agencies, silicon vendors and/or other entities in the semiconductor supply chain, etc.), presently no decision has been made regarding whether to deploy 802.11p or C-V2X on a global scale. In the meantime, some countries and regions have begun small-scale implementations of 802.11p and C-V2X systems. These small-scale deployments of both 802.11p and C-V2X could lead to a dual existence of both technologies, which would hinder interoperability between vehicles that utilize the two different technologies.

In view of the foregoing and/or related ends, various implementations described herein can enable a single vehicle communication system to operate in multiple V2X technologies, e.g., via the implementation of multiple corresponding software stacks in the system. Various implementations as described herein can further intelligently (e.g., via machine learning or other techniques) switch between V2X technologies based on location, network conditions, and/or other factors. In doing so, implementations described herein can improve the overall operability of a V2X system associated with a vehicle, which in turn can improve the overall performance of the vehicle, e.g., via dynamic network adjustments, routing changes, network event detection, or the like. Additionally, improvements in the overall operability of a V2X system as described herein can improve vehicle safety, e.g., by enhancing the ability of different vehicles to communicate with each other to facilitate collision avoidance and/or other beneficial aspects. Other advantages of the implementations described herein are also possible.

With reference now to the drawings, FIG. 1 illustrates a block diagram of a system 100 that facilitates location-aware software defined antenna management in accordance with various implementations described herein. As shown in FIG. 1, system 100 includes a vehicle communication system 10, which can be associated with a vehicle (not shown in FIG. 1). In various implementations, the vehicle communication system 10 can be integrated into the vehicle itself, or alternatively the vehicle communication system 10 can be a third-party or aftermarket system that is physically and/or communicatively coupled to the vehicle. Other implementations are also possible.

As used herein, the term "vehicle" refers to all objects that are capable of carrying passengers and/or cargo through an environment, e.g., via one or more roadways or the like. By way of example, a vehicle as referred to herein can include motorized vehicles such as cars, trucks, buses, motorcycles, electric scooters, boats and/or ships powered via a motor, airplanes, drones, flying taxis, electronic-Vertical-Takeoff-and-Landing (eVTOL) vehicles, etc., as well as human-powered vehicles such as bicycles, boats powered via oars or rowing implements, or the like. No part of this description is intended to limit any of the implementations described herein to any specific type or classification of vehicle, either presently existing or developed in the future, unless explicitly stated otherwise.

As further shown in FIG. 1, the vehicle communication system 10 of system 100 can include one or more antennas 12, which can facilitate communication between the vehicle communication system 10 and other entities, such as vehicle communication systems associated with other nearby vehicles and/or network equipment 20 located in an area around the vehicle communication system 10. Network equipment 20 can include, but is not limited to, network access points such as Wi-Fi access points; cellular access points such as eNodeBs (eNBs) and/or gNodeBs (gNBs); network controller devices such as a RAN (Radio Access Network) Intelligent Controller (RIC), user equipment (UE) such as mobile phones, laptop or tablet computers, etc.; and/or any other device(s) operable to communicate with the vehicle communication system 10 via one or more communication networks. Examples of network equipment 20 that can interact with the vehicle communication system 10 are described in further detail below with respect to FIG. 2.

The vehicle communication system 10 of system 100 further includes a position location component 110, a network monitor component 120, and an antenna configuration component 130, which can operate as described in further detail below. In an implementation, the components 110, 120, 130 of the vehicle communication system 10 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 13.

With respect now to the components 110, 120, 130 of the vehicle communication system 10 shown in FIG. 1, the position location component 110 can generate positioning data corresponding to movement of a vehicle associated with the vehicle communication system 10 through an environment, e.g., as the vehicle is engaged in travel. The position location component 110 can utilize any suitable technique, or combination of techniques, to track the location of an associated vehicle and/or generate corresponding positioning data. For instance, the position location component 110 could utilize satellite positioning (e.g., via the Global Positioning System (GPS) or the like), network-based positioning (e.g., based on trilateration between a set of network access points with known positions), dead reckoning and/or other motion-based navigation techniques, and/or any other suitable technique(s).

The network monitor component 120 of the vehicle communication system 10 can obtain, e.g., from network equipment 20 associated with a communication network operating in the environment in which the vehicle communication system 10 is located, network data associated with the communication network. The network data obtained by the network monitor component 120 can include performance metrics associated with the communication network, information relating to the location of access points and/or other network equipment 20 operating in the communication network, and/or other suitable information. Also or alternatively, the network monitor component 120 can obtain mapping information associated with the environment, a coverage area of the communication network, or the like. Various types of information that can be collected by the network monitor component 120 are described in further detail below with respect to FIG. 3.

Based on the positioning data generated by the position location component 110 and the network data collected by the network monitor component 120, the antenna configuration component 130 of the vehicle communication system 10 can facilitate dynamic configuration of the antennas 12 of the vehicle communication system 10. For instance, based on information received from the position location component 110 and/or the network monitor component 120, the antenna configuration component 130 can facilitate reconfiguring the antennas 12 from a first antenna configuration to a second, different antenna configuration.

In one implementation, the antenna configurations associated with the antenna configuration component 130 can be associated with V2X communication types. For example, the antenna configuration component 130 can be configured to alter the antennas 12 from a first configuration associated with a wireless local area network (WLAN) network type (e.g., an 802.11p configuration) to a second configuration associated with a cellular network type (e.g., a C-V2X configuration), or vice versa. Also or alternatively, the antenna configurations can correspond to different frequency bands used for communication over a single V2X technology or across V2X communication technologies, different access points (e.g., in the event of a handoff or handover), and/or any other suitable aspect of communication via the antennas 12.

Figure 2:
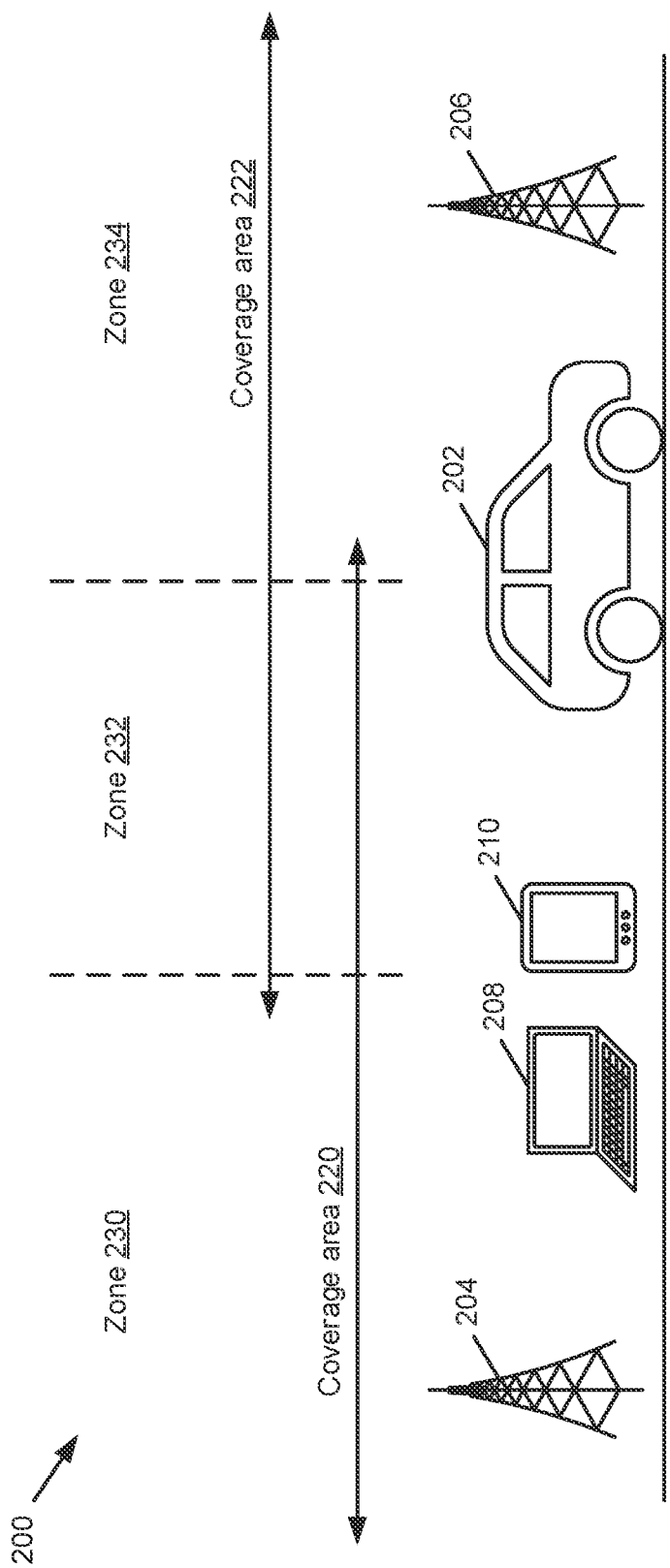
FIG. 2 is a diagram depicting example features of an environment in which various implementations described herein can function.

Referring now to FIG. 2, a diagram 200 depicting example features of an environment in which various implementations described herein can function is provided. Repetitive description of like elements that are employed in other embodiments described herein is omitted for brevity. It is noted that the various elements of diagram 200 are not drawn to scale. As shown in diagram 200, a vehicle 202, e.g., a vehicle associated with a vehicle communication system 10 as described above with respect to FIG. 1, can travel through the depicted environment via one or more roadways or other surfaces. While the vehicle 202 in diagram 200 is represented as a car, it is noted that other types of vehicles are also possible.

As further shown in diagram 200, a first network access point 204 (e.g., a cellular access point, Wi-Fi access point, etc.) can provide network coverage over a first coverage area 220. Similarly, a second network access point 206 (e.g., an access point of the same type as the network access point 204 or a different type) can provide network coverage over a second coverage area 222. The respective boundaries of the coverage areas 220, 222 (e.g., as defined by areas at which a signal strength associated with the corresponding network access points 204, 206 falls below a given threshold, and/or in any other suitable manner) can be utilized to define location zones 230, 232, 234 within the environment. For instance, as shown in diagram 200, location zone 230 corresponds to an area within coverage area 220 but not coverage area 222, location zone 232 corresponds to an area within both coverage areas 220, 222, and location zone 234 corresponds to an area within coverage area 222 but not coverage area 220. Other techniques for defining location zones within an environment could also be used.

In addition to the network access points 204, 206, the vehicle 202 shown in diagram 200 can interact with other mobile devices 208, 210 within the environment. Mobile devices 208, 210 that can interact with the vehicle 202 can include, but are not limited to, laptop or tablet computers, smartphones, wearable computing devices, or the like. In some examples, mobile devices 208, 210 as shown in diagram 200 can be held by and/or otherwise associated with pedestrians and/or other users located in or near the environment that are not associated with respective vehicles within the environment. Also or alternatively, the vehicle 202 can interact with other vehicles (e.g., trucks, cars, scooters, bicycles, etc.) in the environment, e.g., via vehicle communication systems and/or other communication devices associated with those vehicles. As a further example, the vehicle 202 can interact with roadside units (RSUs) (not shown in diagram 200) and/or other devices configured to provide the vehicle 202 with information relating to the environment.

In an implementation, a vehicular communication system associated with the vehicle 202 can change (e.g., via an antenna configuration component as shown in FIG. 1) its device antenna configuration programmatically while traveling through the environment shown in diagram 200 and interacting with respective devices in that environment. Alteration of an antenna configuration in this manner can be based on one or more factors, which can include, but are not limited to, the following:
1) Precise location, trajectory, and velocity
2) Real-time and historic network telemetry
3) Artificial intelligence (AI)/machine learning (ML) and telemetry projections
4) Smart radio technology selection
5) Adaptive antenna selection and configuration Other factors could also be used. By way of example, one or more of the above factors could be utilized by a vehicular communication system of the vehicle 202 to locate and/or identify other vehicles that are in close proximity to the vehicle 202. In response to identifying other nearby vehicles, the vehicular communication system of the vehicle 202 could switch between V2X technologies and/or perform other adjustments, such as adjusting the antennas in a way that optimizes for a specific communication type, e.g., V2V or V2N. In another example, the vehicular communication system of the vehicle 202 could optimize its antennas for V2N communication in order to access cloud services provided in the environment.

Figure 3:
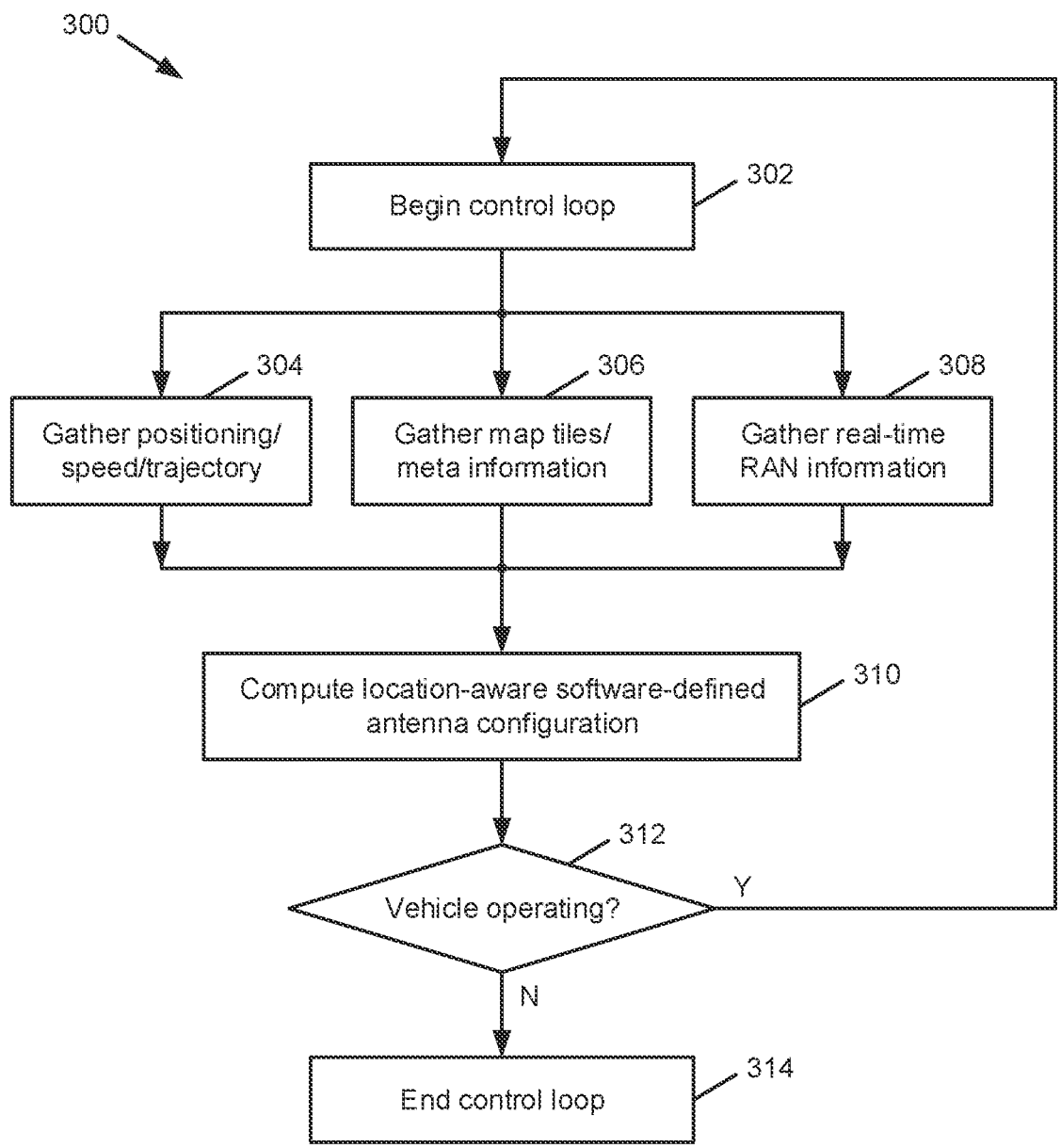
FIG. 3 is a flow diagram of a method for controlling a location-aware software defined antenna management system in accordance with various implementations described herein.

Turning next to FIG. 3, and with further reference to FIG. 1, a flow diagram of a method 300 that facilitates controlling a location-aware software defined antenna management system is illustrated. Method 300 as shown in FIG. 3 is implemented as a control loop, which can begin at 302 in response to an initiating event, e.g., turning on or otherwise starting a vehicle associated with the vehicle communication system 10. In response to initiation of the control loop at 302, data collection can be performed as shown at 304, 306, 308. In various implementations, the data collection operations shown at 304, 306, 308 can occur at the same time and/or at different times. Further, while 304, 306, and 308 are illustrated as occurring prior to the computations shown at 310 (which will be described in further detail below), it is noted that the operations shown at 304, 306, 308 can occur before, during, or after the computations shown at 310.

At 304, the vehicle communication system 10 can gather (e.g., via the position location component 110) data associated with positioning, speed, and/or trajectory of an associated vehicle. In an implementation, positioning, speed, and/or trajectory data can be gathered at 304 from sources associated with the underlying vehicle. For example, the data gathered at 304 can include GPS coordinates, e.g., as obtained from a GPS receiver or other navigation device associated with the vehicle, speed and/or trajectory readings provided by a control system associated with the vehicle, and/or other such data. Also or alternatively, the data gathered at 304 can include data relating to cellular tracking areas, e.g., as identified by the antennas 12 of the vehicle communication system 10 and/or other suitable means.

At 306, the vehicle communication system 10 can gather (e.g., via the network monitor component 120) information associated with infrastructure located in the environment, such as map tiles corresponding to network coverage maps in the area, metadata associated with said coverage maps, and/or other information. In an implementation, the infrastructure information gathered at 306 can include information relating to the locations of RSUs operating in the environment. In addition, the information gathered at 306 can include data provided by an RSU, such as information relating to traffic incidents or reports, speed limits or recommendations, weather conditions, or the like. Data associated with a given RSU as collected at 306 can also relate to components of the RSU, such as the number and/or type(s) of antennas associated with the RSU. In an implementation, data associated with the antennas employed by a given RSU can be utilized to adapt the vehicle communication system 10 to a particular communication network, as will be described in further detail below with respect to FIG. 8.

At 308, the vehicle communication system 10 can gather (e.g., via the network monitor component 120) real-time or substantially real-time network information, e.g., from an Open Radio Access Network (O-RAN) RAN Intelligent Controller (RIC) and/or other sources. The RAN information gathered at 308 can include information related to access point transmit power and/or observed signal strength, base station or access point utilization, bit level or link level error rate, and/or other metrics associated with the associated RAN.

Based on the data gathered at 304, 306, and 308, and/or other suitable data, the vehicle communication system 10 can compute (e.g., via the antenna configuration component 130) a location-aware software-defined antenna configuration as shown at 310. In an implementation, computation of an antenna configuration as shown at 310 can begin by converging and/or otherwise compiling the associated gathered data, e.g., the data collected at 304, 306, and 308. This compiled data can then be utilized to determine one or more configuration properties to be applied to the antennas 12. These properties can include the technology type used for communication (e.g., a WLAN technology and/or a wireless wide area network (WWAN) or cellular technology), a band filter applied to the antennas 12, a signal strength to be utilized by the antennas 12, a multiple-input multiple-output (MIMO) level to be used by the antennas 12, and/or other suitable properties. As the antenna configuration computed at 310 is location aware, the computations performed at 310 can be repeated as the vehicle associated with the vehicle communication system 10 travels through an environment.

In an implementation, the operations associated with the control loop as shown at 304, 306, 308, and 310 can continue while the associated vehicle is operational. Thus, at 312, the vehicle communication system 10 can determine whether the associated vehicle continues to operate. If the vehicle remains operational, method 300 can return to 302 to continue the control loop. Otherwise, if the vehicle is determined to have been powered off and/or otherwise rendered non-operational, method 300 can conclude at 314 by ending the control loop.

Figure 4:
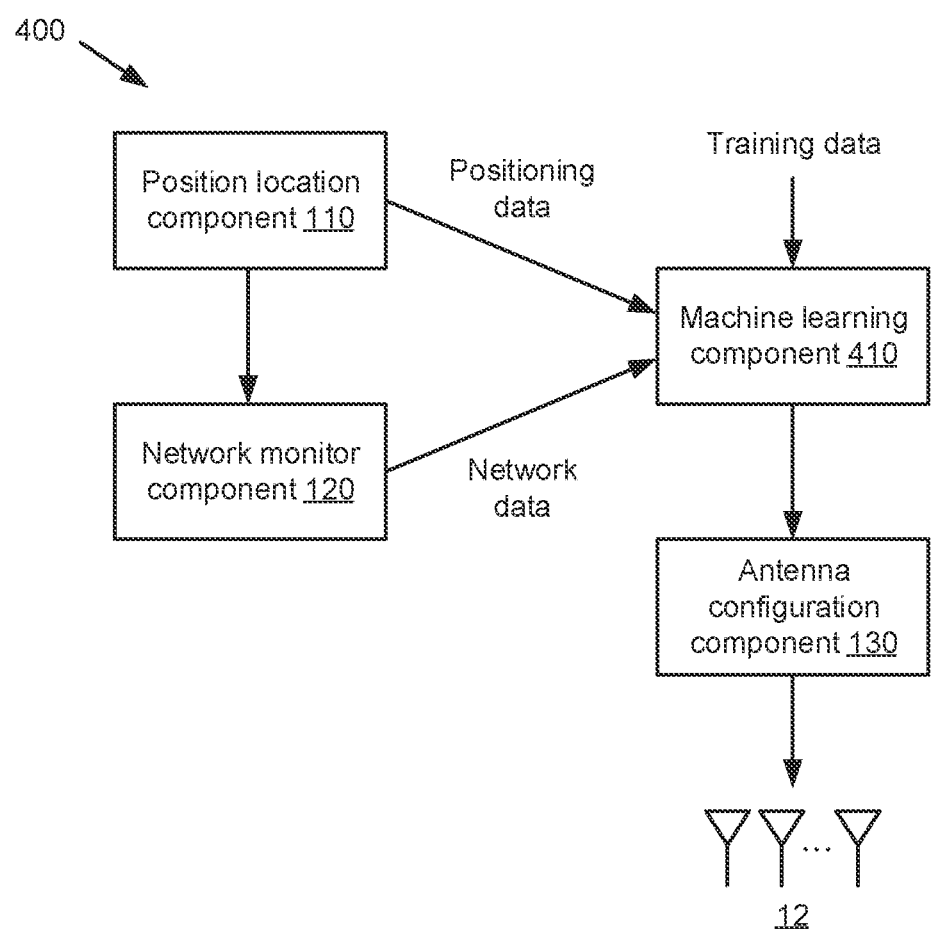
FIG. 4 is a block diagram of a system that facilitates adaptive antenna management via machine learning in accordance with various implementations described herein.

With reference now to FIG. 4, a block diagram of a system 400 that facilitates adaptive antenna management via machine learning is illustrated. Repetitive description of like elements that are employed in other embodiments described herein is omitted for brevity. As shown in FIG. 4, positioning data generated by the position location component 110 and network (and/or infrastructure) data collected by the network monitor component 120 can be provided to a machine learning component 410. The machine learning component 410 can select an antenna configuration by classifying the positioning data and the network data according to a machine learning model. In response to the machine learning component 410 selecting an antenna configuration, the selected configuration can be applied to the antennas 12 by the antenna configuration component 130.

In an implementation, the machine learning component 410 can select an antenna configuration from among a group of candidate antenna configurations, e.g., configurations corresponding to V2X communication types and/or other properties. Alternatively, the machine learning component 410 can select individual properties, or groups of properties, associated with an antenna configuration to be applied by the antenna configuration component 130. As another alternative, the machine learning component 410 can produce model output corresponding to an antenna configuration and/or antenna configuration properties, and the antenna configuration component 130 can select and/or apply an antenna configuration based on the provided model output.

As additionally shown in FIG. 4, a machine learning model utilized by the machine learning component 410 can be trained using a set of training data provided to the machine learning component 410. In an implementation, some or all of the training data provided to the machine learning component 410 can be obtained from nearby vehicles or other devices capable of network communication, e.g., via crowdsourcing, as will be described in further detail below with respect to FIG. 6.

Figure 5:
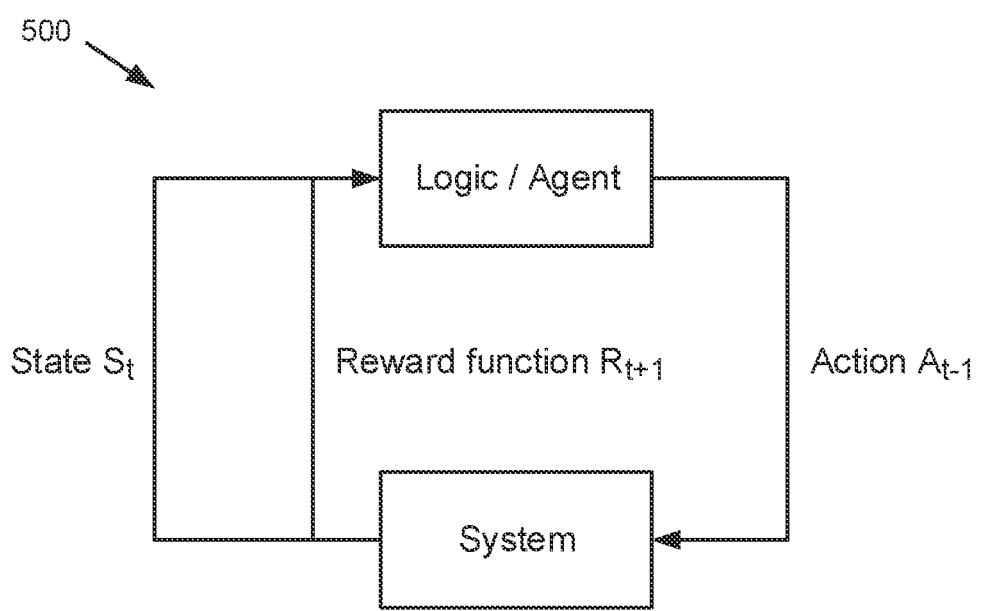
FIG. 5 is a diagram depicting an example machine learning model that can be utilized by the system of FIG. 4 in accordance with various implementations described herein.

Diagram 500 in FIG. 5 illustrates an example machine learning model that can be utilized by the machine learning component 410. The model shown in diagram 500 is a reinforcement learning model, in which decisions made via the model are influenced by a reward function, e.g., as described below. Other machine learning models could also be used, such as models based simply on policies or logical rules.

In the example shown by diagram 500, a reinforcement learning algorithm can utilize programmable logic, an agent module, or the like, to perform an action A on a system, e.g., a vehicle communication system 10 and/or portions of the system, such as antennas 12, at a time t−1. At a subsequent time t, the system can monitor the state S of the system. Based on a change observed to the state S of the system as a result of the action A performed at time t−1, e.g., a delta between the state S of the system from time t−1 to time t, a reward function R can be applied to the logic and/or agent at time t+1 to influence future actions A.

In an implementation, the state S of the system can relate to the connectivity of the antennas 12 of an associated vehicle communication system 10 to one or more associated networks (e.g., in terms of signal quality, error rate, etc.), and an output of the reward function R for time t+1 can be proportional to a net change in connectivity of the antennas 12 resulting from a configuration change to the antennas 12, e.g., as performed via an action A at time t−1. Stated another way, in response to performance of an action A, the reward function R can apply a positive reward in the event that the action A results in the connectivity of the antennas 12 improving and/or a negative reward in the event that the action A results in the connectivity of the antennas becoming worse and/or interrupted.

In various implementations, a software-driven antenna configuration algorithm as described herein can be performed by a local device (e.g., a vehicle communication system 10, via a machine learning component 410 as shown in system 400 based on the model shown in diagram 500, and/or via other suitable components of the vehicle communication system 10), in a communication network (e.g., a network with which a vehicle communication system 10 communicates via antennas 12), or a combination of a local device with network functions. The antenna configuration algorithm can accept as input one or more of the input factors described above with respect to FIG. 2, i.e., (1) precise location, trajectory, and velocity; (2) real-time and historic network telemetry; (3) AI/ML and telemetry projections; (4) smart radio technology selection; and (5) adaptive antenna selection and configuration. Also or alternatively, input to the antenna configuration algorithm can include historic route and/or path information, which can be maintained via the network or at the vehicle communication system 10.

Based on the above and/or other inputs, a configuration algorithm as executed via the vehicle communication system 10 and/or various network functions can derive radio network types in an area around an associated vehicle, e.g., based on the proximity of the vehicle to respective physical networks with respect to given map information based on the current location, trajectory, and velocity of the vehicle. The map information utilized in this manner can be created and/or maintained at the vehicle communication system 10 and/or on the network to map radio networks and signal strength measurements to given locations. Additionally, the configuration algorithm can be used to determine, plan, and/or execute actions for the vehicle communication system 10 to take based on network events, as will be described in further detail below with respect to FIG. 8.

Figure 6:
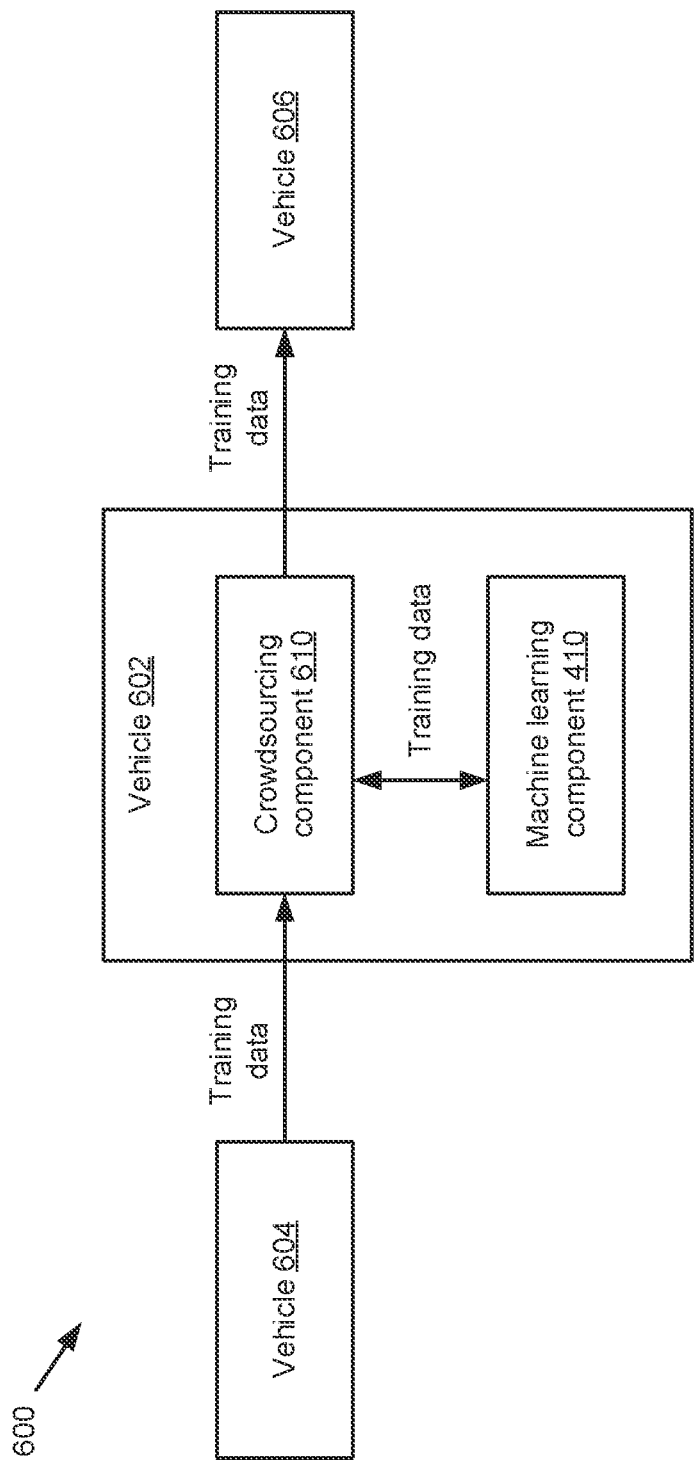
FIG. 6 is a block diagram of a system that facilitates crowdsourcing of machine learning data in accordance with various implementations described herein.

Referring next to FIG. 6, a block diagram of a system 600 that facilitates crowdsourcing of machine learning data, e.g., machine learning data used by a machine learning component 410 as described above with respect to FIG. 4, is illustrated. Repetitive description of like elements that are employed in other embodiments described herein is omitted for brevity. System 600 as shown in FIG. 6 includes a vehicle 602 that includes a machine learning component 410, e.g., as implemented via a vehicle communication system 10 (not shown) at the vehicle 602, which can operate as described above.

As noted above with respect to FIG. 4, the machine learning component 410 can utilize training data and/or other data provided to the machine learning component 410 in determining antenna configuration parameters. To this end, the vehicle 602 of system 600 further includes a crowdsourcing component 610 that can transfer training data used by the machine learning component 410, and/or other types of data provided as input to the machine learning component 410, between the vehicle 602 and one or more other vehicles 604, 606 operating in the environment.

As an example of the above as illustrated by FIG. 6, the crowdsourcing component 610 of the vehicle 602 can obtain some or all training data utilized by the machine learning component 410 from another, distinct vehicle 604. Similarly, the crowdsourcing component 610 can provide training data and/or other data generated by the machine learning component 410, along with and/or separate from training data and/or other data obtained via the crowdsourcing component 610 from the vehicle 604, from the vehicle 602 to a subsequent vehicle 606. As an example, the machine learning component 410 can generate training data as a result of classifying input data (e.g., to select an antenna configuration), and the crowdsourcing can provide this data, along with training data provided to the machine learning component 410 via the crowdsourcing component 610, to the vehicle 606.

By crowdsourcing machine learning data as shown by system 600, respective vehicles 602, 604, 606 traveling within an environment can apply the same and/or similar models using a common set of machine learning data. This, in turn, can improve the performance of antenna configuration and/or other machine learning tasks performed by the vehicles 602, 604, 606 by enabling the vehicles 602, 604, 606 to utilize more robust sets of training data than said vehicles 602, 604, 606 could generate themselves.

While the crowdsourcing component 610 and machine learning component 410 are illustrated in FIG. 6 as being associated with a vehicle 602, it is noted that some or all of the functionality of the crowdsourcing component 610 and the machine learning component 410 could be implemented via one or more network functions, e.g., functions of a network operating in the environment, in addition to and/or in place of the vehicle 602.

Figure 7:
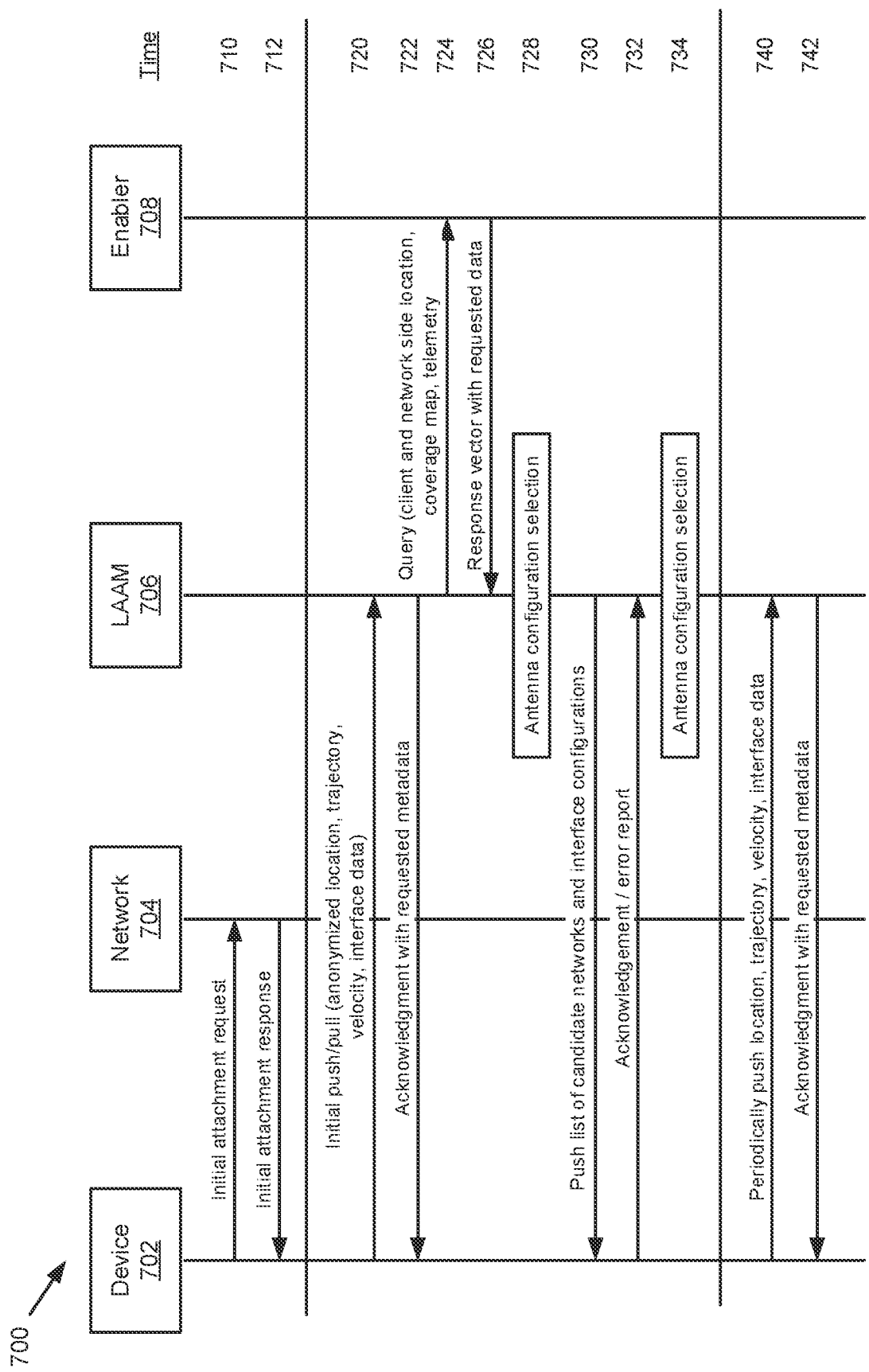
FIG. 7 is a messaging flow diagram depicting respective techniques for communicating data related to location-aware software defined antenna management in accordance with various implementations described herein.

Turning now to FIG. 7, a messaging flow diagram 700 that depicts respective techniques for communicating data related to location-aware software defined antenna management is provided. More particularly, FIG. 7 depicts example messaging flows that can occur between a device 702 (e.g., a device associated with a vehicle communication system 10), a communication network 704, a location-aware antenna management (LAAM) function 706, and an enabler function 708. In various implementations, the LAAM function 706 can be implemented via the device 702 (e.g., via an antenna configuration component 130 of a vehicle communication system 10 as described above), the network 704, and/or a combination of the device 702 and the network 704. The enabler function 708 shown in FIG. 7 can be implemented via one or more network sources that provide information utilized by the LAAM function 706. By way of example, the enabler function 708 can be implemented via an O-RAN RIC and/or any other suitable network equipment that can provide information such as network map data, network performance data, or other appropriate information to the LAAM function 706. It is further noted that FIG. 7 merely represents examples of procedures that could be utilized by the illustrated devices and functions, and that other procedures could also be used.

The procedure shown by diagram 700 begins with an initial network attachment procedure, in which the device 702 provides an initial attachment request to the network 704 at time 710, in response to which the network 704 returns an initial attachment response to the device 702 at time 712. As a result of the messaging exchanged at times 710-712, a connection can be established between the device 702 and the network 704. While a single message exchange is illustrated at times 710-712, it is noted that additional messages could be transmitted to facilitate a connection between the device 702 and the network 704 in addition to, or in place of, the exchange shown at times 710-712.

Subsequent to a connection being established between the device 702 and the network 704, a control loop for antenna configuration management can be executed as shown at times 720-734. As noted above with respect to FIG. 3, the control loop shown at times 720-734 can be periodically repeated, e.g., while a vehicle associated with the device 702 is operational. An instance of the control loop could also be performed in response to a triggering event, as will be described in further detail below with respect to FIG. 8.

The control loop shown by FIG. 7 begins at time 720, in which the device 702 performs an initial push/pull of data to the LAAM function 706 (e.g., implemented via the device 702 and/or the network 704). Data transferred by the device 702 at time 720 can include anonymized location, trajectory, and/or velocity data, interface data associated with the device 702, and/or other suitable data. In response to the data transmitted at time 720, the LAAM function 706 can provide an acknowledgement to the device 702 at time 722. In an implementation in which the data sent by the device at time 720 includes a request for metadata, the acknowledgement sent by the LAAM function 706 at time 722 can include the requested metadata.

Next, at time 724, the LAAM function 706 can submit a query to the enabler function 708 for additional information, such as client- and network-side location data, network coverage map data, telemetry information, or the like. In response to the query provided at time 724, the enabler function 708 can return a response with the requested information to the LAAM function 706 at time 726. At time 728, the LAAM function 706 can then select antenna configuration(s) for use by the device 702, e.g., via a machine learning algorithm as described above, based on the information received from the device 702 at time 720 and the information received from the enabler function 708 at time 726.

At time 730, the LAAM function 706 can provide a list of candidate networks and/or interface configurations to the device 702, e.g., such that the device 702 can reconfigure its antennas according to the candidate networks and/or interface configurations. At time 732, the device 702 can return an acknowledgement or an error report to the LAAM device 706 in response to success or failure of the reconfiguration, respectively. Based on the acknowledgement and/or error report received by the LAAM function 706 at time 732, the LAAM function 706 can conclude the control loop by updating its antenna configuration selection at time 734.

In addition to the control loop shown at times 720-734, the device 702 can send periodic updates to the LAAM function at time 740, which can include information that is similar to that sent by the device 702 to the LAAM function 706 at time 720. In response, the LAAM function 706 can provide an acknowledgement to the device 702 at time 742 that is similar to the acknowledgement sent by the LAAM function 706 at time 722.

Figure 8:
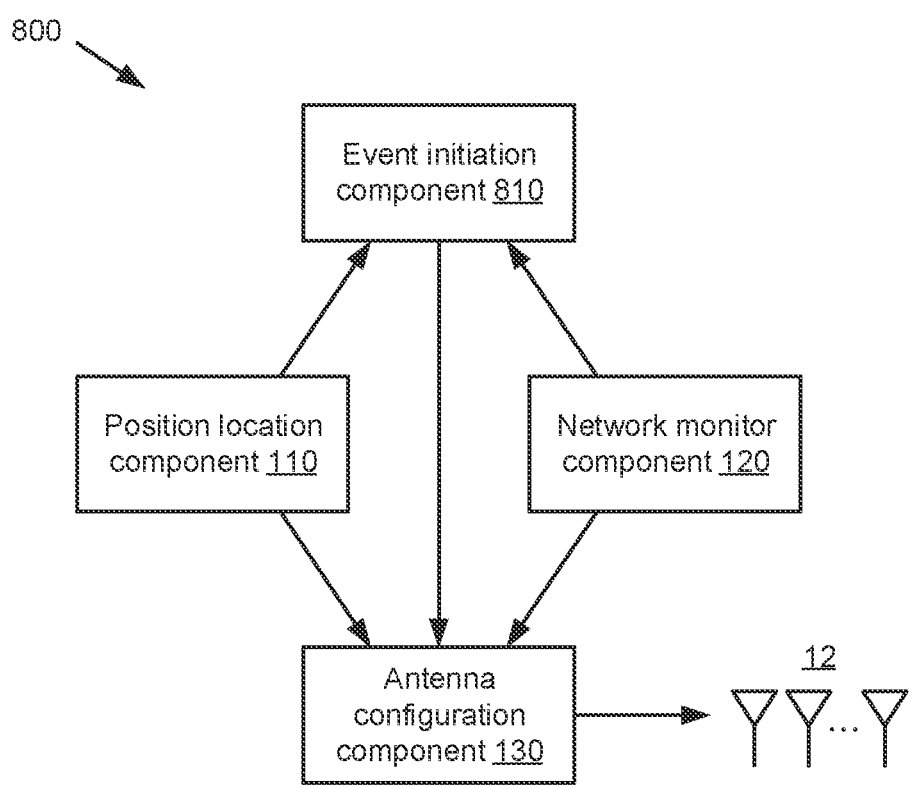
FIG. 8 is a block diagram of a system that facilitates event initiation in a vehicular communication system in accordance with various implementations described herein.

Referring next to FIG. 8, a block diagram of a system 800 that facilitates event initiation in a vehicular communication system is illustrated. Repetitive description of like elements that are employed in other embodiments described herein is omitted for brevity. System 800 as shown in FIG. 8 includes an event initiation component 810, which can facilitation determination and planning for future actions to be taken by the antenna configuration component 130 and/or prepared by an associated communication network. For instance, based on network coverage information and/or other suitable information, the event detection component 810 can facilitate actions in the network and/or within the device such as handover or handoff events, carrier aggregation, band changes, enabling or disabling a given network, or the like.

By way of specific example, the event detection component 810 can initiate a mobility event (e.g., a handoff, handover, etc.) associated with a communication network. In response to the mobility event being initiated, the antenna configuration component 130 can reconfigure associated antennas 12 to perform and/or prepare for the mobility event. As another example, in the event that the network monitor component 120 detects a given antenna type and/or RSU that is likely to be encountered by an associated vehicle given the trajectory of the vehicle, the event detection component 810 can facilitate adaptation of the antennas 12 to the detected infrastructure. Other use cases are also possible.

Figure 9:
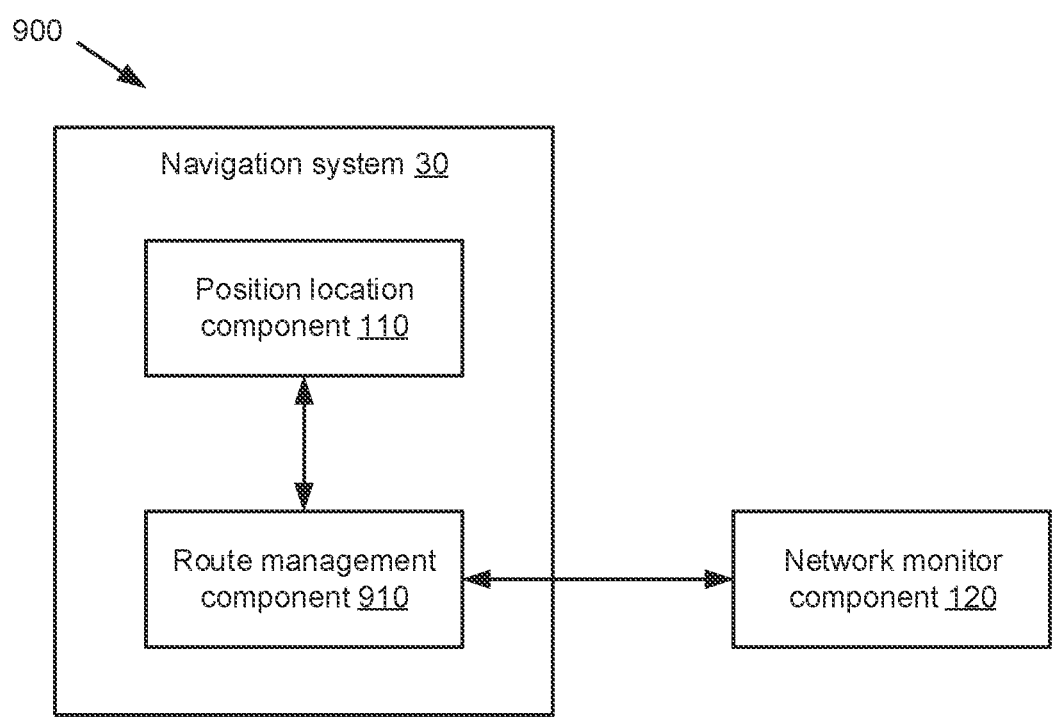
FIG. 9 is a block diagram of a system that facilitates vehicle route adjustment based on network data in accordance with various implementations described herein.

With reference now to FIG. 9, a block diagram of a system 900 that facilitates vehicle route adjustment based on network data is illustrated. Repetitive description of like elements that are employed in other embodiments described herein is omitted for brevity. System 900 as shown in FIG. 9 includes a navigation system 30 that includes a position location component 110 as described above as well as a route management component 910, which can generate navigation data indicative of a suggested route of a vehicle associated with the navigation system 30 through an environment, e.g., based on network data collected by a network monitor component 120. For instance, the network monitor component 120 can provide the route management component 910 with information relating to network coverage in an area along respective travel routes that can be taken by an associated vehicle through an environment, and the route management component 910 can influence the route of the vehicle (e.g., through visual or audible information provided to a vehicle operator, instructions to an autonomous vehicle, etc.) based on the received coverage information.

Figure 10:
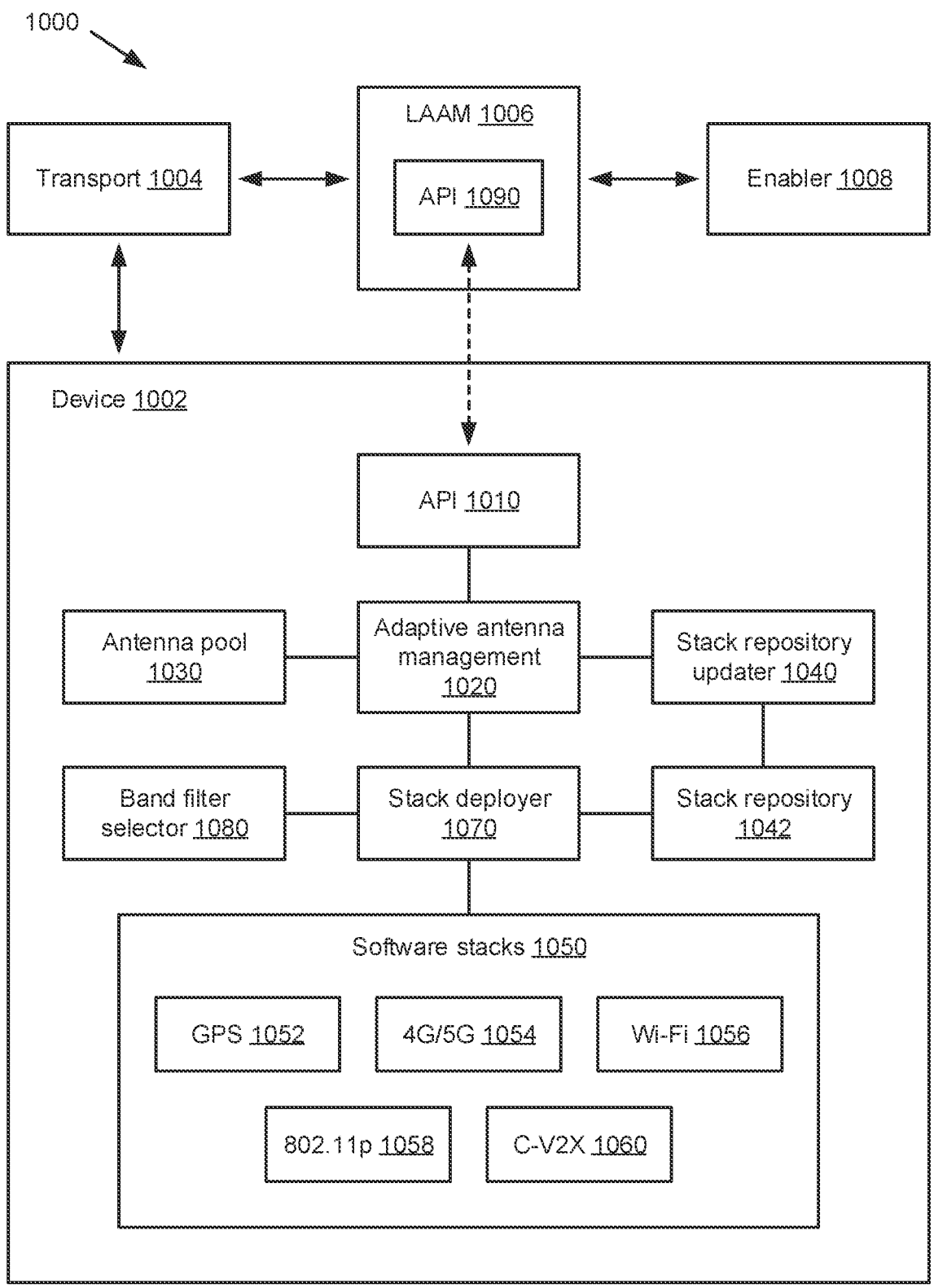
FIGS. 10-11 are diagrams depicting example architectures and interfaces in which various implementations described herein can function.
Figure 11:
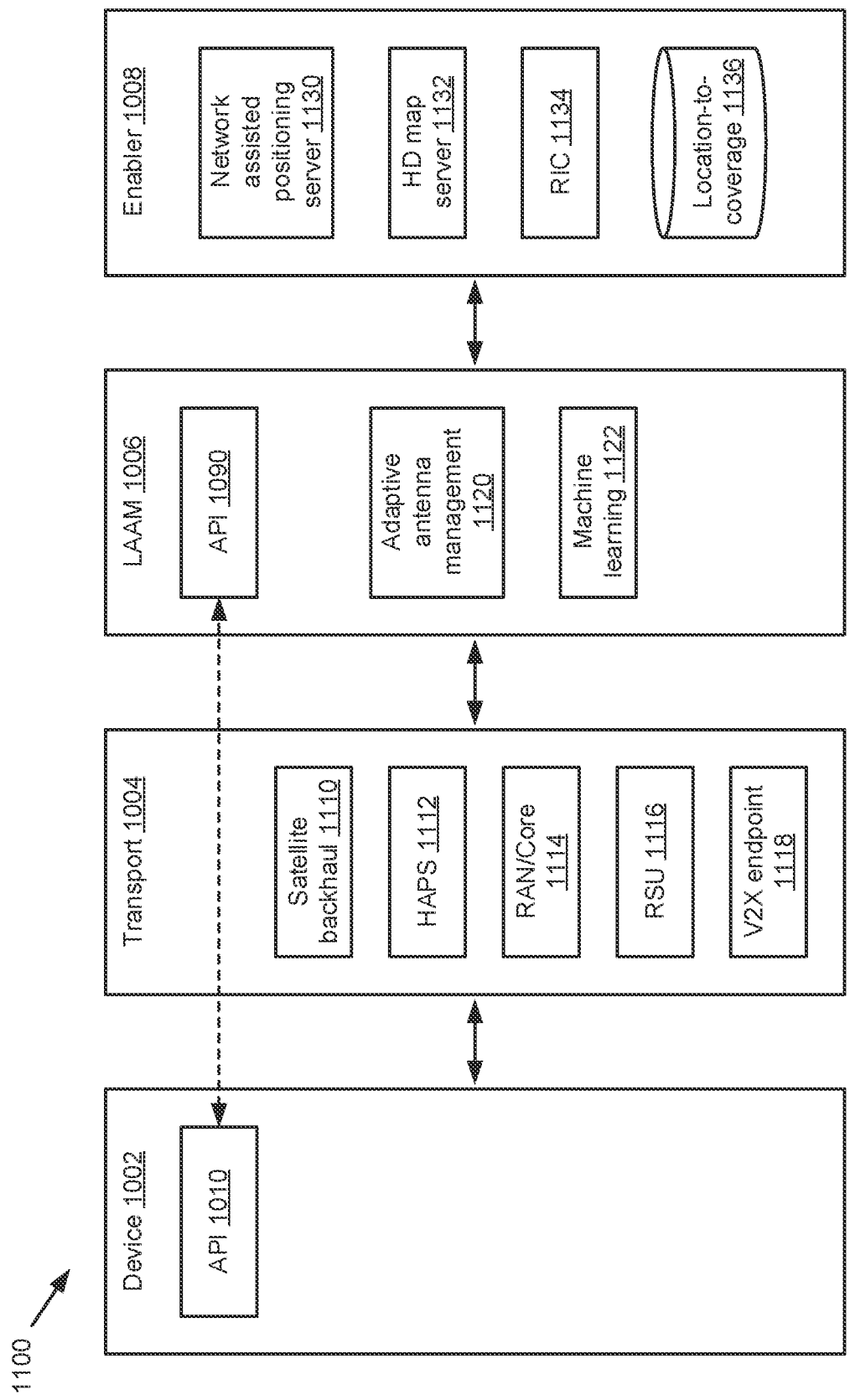

Turning next to FIGS. 10-11, diagrams 1000, 1100 depicting an example architecture and respective interfaces that can be utilized by a device 1002, e.g., a device 1002 implementing a vehicle communication system 10 as described above, is provided. In diagrams 1000, 1100, solid lines between respective elements represent physical connections between those elements, while dashed lines between elements represent logical connections.

With reference first to diagram 1000 in FIG. 10, the device 1002 can communicate with devices associated with respective function groups, including a transport function group 1004, an LAAM function group 1006, and an enabler function group 1008. The LAAM function group 1006 and enabler function group 1008 can be implemented in a similar manner to the LAAM function 706 and enabler function 708 described above with respect to FIG. 7. Various elements of said function groups 1006, 1008 are described below with respect to FIG. 11. As further shown by diagram 1000, a connection between the device 1002 and the LAAM function group 1006 can be a logical connection that is facilitated via a first application programming interface (API) 1010 at the device and a second API 1090 associated with the LAAM function group 1006.

The device 1002 shown in diagram 1000 includes an adaptive antenna management module 1020, which can dynamically configure one or more antennas of an antenna pool 1030, e.g., using one or more techniques described above with respect to the antenna configuration component 130 and antennas 12. The device 1002 further includes a stack repository updater module 1040, which can facilitate updates and/or other maintenance operations for a set of software stacks 1050 maintained via a stack repository 1042 at the device. As shown by diagram 1000, the software stacks 1050 can include software modules that facilitate communication by the device 1002 over respective communication technologies. For instance, the software stacks 1050 shown in diagram 1000 include a GPS stack 1052, a 4G/5G stack 1054, a Wi-Fi stack 1056, an 802.11p stack 1058, and a C-V2X stack 1060. Other software stacks could also be used.

As further shown in diagram 1000, the device 1002 can include a stack deployer module 1070, which can load respective software stacks 1050 from the stack repository 1042 to facilitate communication by the device 1002 over the respectively corresponding network technologies. The stack deployer module 1070 can facilitate the execution of multiple software stacks 1050 in parallel, or alternatively the stack deployer module 1070 can enforce isolation of the respective software stacks 1050. The device 1002 shown in diagram 1000 further includes a band filter selector module 1080, which can apply and/or adjust a band filter utilized by the device 1002 for communication, e.g., based on a configuration of the antenna pool 1030 as set by the adaptive antenna management module 1020.

With reference next to diagram 1100 in FIG. 11, the transport function group 1004 can include respective network functions that facilitate the communication of data between the device 1002 and the LAAM function group 1006. As shown in diagram 1100, these functions can be associated with a satellite backhaul link 1110, a high altitude platform system (HAPS) 1112, a RAN and/or core network 1114, an RSU 1116, a V2X endpoint 1118, and/or other suitable network entities.

The LAAM function group 1006, in addition to the API 1090 described above, can include an adaptive antenna management function 1120, which can facilitate configuration of the antenna pool 130 of the device 1002, e.g., using respective location-aware software-defined antenna management techniques as described above. As further shown in diagram 1100, the LAAM function group 1006 can include a machine learning module 1122, which can facilitate antenna configuration via one or more machine learning techniques, e.g., as described above with respect to FIGS. 4-5.

The enabler function group 1008 can be associated with respective network entities that can provide information to the LAAM function group 1006 to facilitate antenna configuration as described above. As shown in diagram 1100, the enabler function group 1008 can be implemented via a network assisted positioning server 1130, a high definition (HD) map server 1132, a RIC 1134, a location-to-coverage data store 1136, and/or other suitable network entities.

With regard to the V2X categories discussed above, Table 1 below lists example antenna technologies that can be utilized for respective V2X categories, such as V2V, V2P, V2I, V2N, and in-car hotspots (e.g., a network hotspot located in a vehicle to provide communication service for respective devices in the vehicle).

TABLE 1

Technologies for implementation of V2X categories.

| Category | Technology options | Minimum active technologies |
|---|---|---|
| V2V, V2P, V2I | 802.11p, C-V2X | At least 1 |
| V2N | C-V2N Uu | 0 to many (carrier aggregation, link diversity) |
| In-car hotspot | Unlicensed, shared, licensed | 0 to N (client device specific) |

Figure 12:
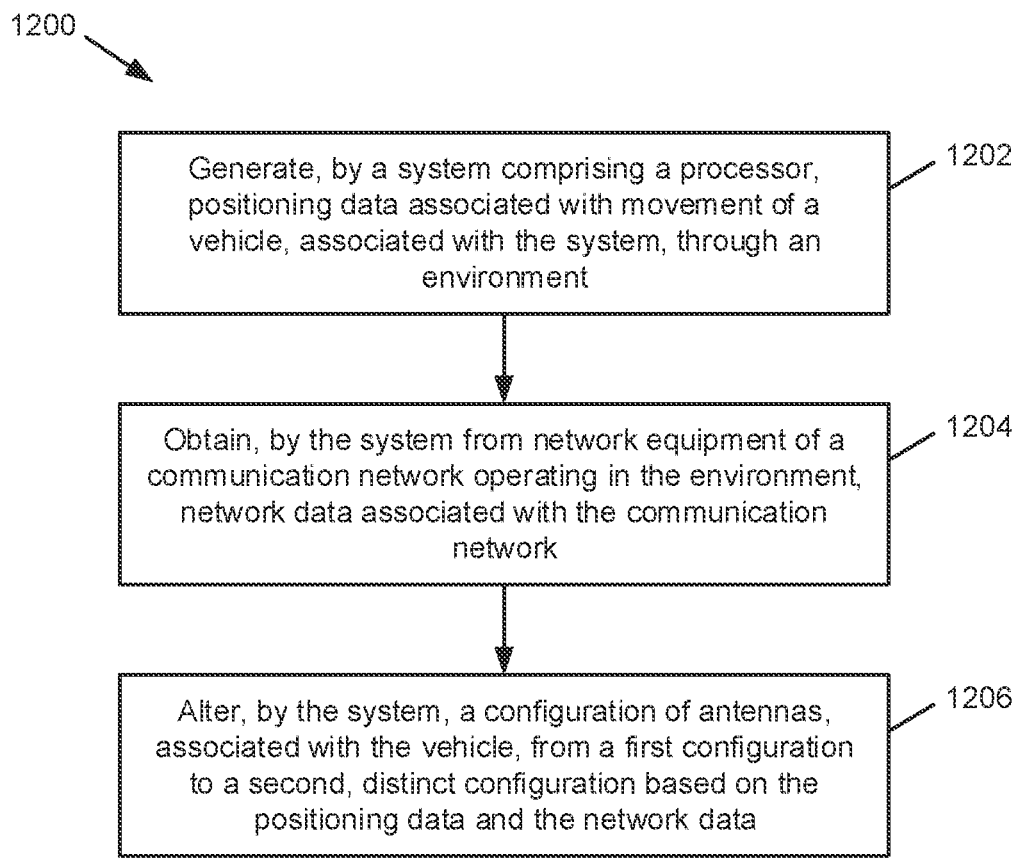
FIG. 12 is a flow diagram of a method that facilitates location-aware software defined antenna management in accordance with various implementations described herein.

Referring next to FIG. 12, a flow diagram of a method 1200 that facilitates location-aware software defined antenna management is illustrated. At 1202, a system (e.g., a vehicle communication system 10) operatively coupled to a processor can generate (e.g., via a position location component 110) positioning data associated with movement of a vehicle, associated with the system, through an environment.

At 1204, the system can obtain (e.g., by a network monitor component 120), from network equipment (e.g., network equipment 20) of a communication network operating in the environment, network data associated with the communication network.

At 1206, the system can alter (e.g., by an antenna configuration component 130) a configuration of antennas (e.g., antennas 12), associated with the vehicle, from a first configuration to a second, distinct configuration based on the positioning data generated at 1202 and the network data obtained at 1204.

FIGS. 3 and 12 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 13:
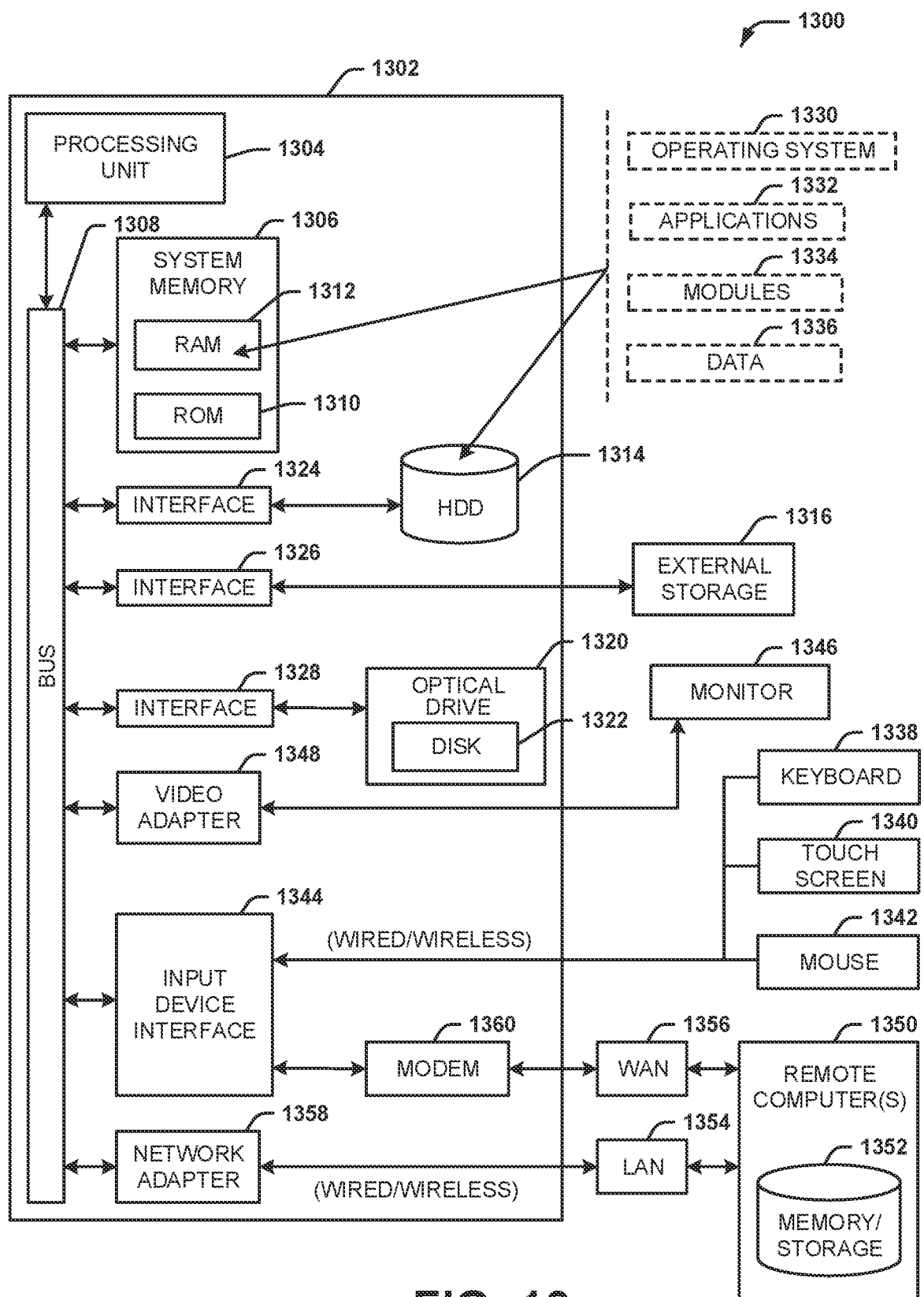
FIG. 13 is a diagram of an example computing environment in which various implementations described herein can function.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD), a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive-in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A vehicle communication system, comprising:
    antennas configured according to a first antenna configuration;
    a memory that stores executable components; and
    a processor that executes the executable components stored in the memory, wherein the executable components comprise:
        a position location component that generates positioning data corresponding to movement of a vehicle, associated with the vehicle communication system, through an environment;
        a network monitor component that obtains, from network equipment of a communication network operating in the environment, network data associated with the communication network;
        a machine learning component that selects a second antenna configuration, from a group of antenna configurations comprising the first antenna configuration and the second antenna configuration, by classifying the positioning data and the network data according to a model, wherein the model was trained with training data; and
        an antenna configuration component that causes the antennas to be configured according to the second antenna configuration, instead of the first antenna configuration, based on the positioning data and the network data and in response to the machine learning component selecting the second antenna configuration.

2. The vehicle communication system of claim 1, wherein the network data comprises a location of a roadside unit operating in the environment.

3. The vehicle communication system of claim 1, wherein the network data comprises a network performance metric selected from a group of network performance metrics comprising a network error rate, a network resource utilization rate, and a transmit power associated with signaling transmitted by the communication network.

4. The vehicle communication system of claim 1, wherein the vehicle is a first vehicle, and wherein the executable components further comprise:
    a crowdsourcing component that obtained the training data from a second vehicle, distinct from the first vehicle, operating in the environment.

5. The vehicle communication system of claim 4, wherein the training data is first training data, wherein the machine learning component generates second training data based on a result of the classifying of the positioning data and the network data, and wherein the crowdsourcing component transmits the first training data and the second training data to a third vehicle, distinct from the first vehicle, operating in the environment.

6. The vehicle communication system of claim 1, wherein the machine learning component applies a reward function to the model in response to the antenna configuration component causing the antennas to be configured according to the second antenna configuration, and wherein an output of the reward function is proportional to a net change in connectivity of the antennas resulting from the antennas being configured according to the second antenna configuration.

7. The vehicle communication system of claim 1, wherein the first antenna configuration corresponds to a first network type selected from a group comprising a wireless local area network and a cellular network, and wherein the second antenna configuration corresponds to a second network type, selected from the group, that is distinct from the first network type.

8. The vehicle communication system of claim 1, wherein the executable components further comprise:
    an event initiation component that initiates a mobility event associated with the communication network, wherein the antenna configuration component causes the antennas to be configured according to the second antenna configuration in response to the event detection component initiating the mobility event.

9. The vehicle communication system of claim 1, wherein the executable components further comprise:

a route management component that generates navigation data, indicative of a suggested route of the vehicle through the environment, based on the network data.

10. A method, comprising:
generating, by a system comprising a processor, positioning data associated with movement of a vehicle, associated with the system, through an environment;
obtaining, by the system from network equipment of a communication network operating in the environment, network data associated with the communication network;
altering, by the system, a configuration of antennas, associated with the vehicle, from a first configuration to a second configuration, distinct from the first configuration, based on the positioning data and the network data; and
selecting, by the system, the second configuration, from a group of configurations comprising the first configuration and the second configuration, by classifying the positioning data and the network data according to a machine learning model, wherein the altering comprises altering the configuration of the antennas in response to the selecting.

11. The method of claim 10, wherein the machine learning model has been trained with training data, wherein the vehicle is a first vehicle, and wherein the method further comprises:
obtaining, by the system, the training data from a second vehicle, distinct from the first vehicle, operating in the environment.

12. The method of claim 11, wherein the training data is first training data, and wherein the method further comprises:
generating, by the system, second training data based on a result of the classifying of the positioning data and the network data; and
transferring, by the system, the first training data and the second training data to a third vehicle, distinct from the first vehicle, operating in the environment.

13. The method of claim 10, wherein the first configuration corresponds to a first network type selected from a group comprising a wireless local area network and a cellular network, and wherein the second configuration corresponds to a second network type, selected from the group, that is distinct from the first network type.

14. A non-transitory machine-readable medium comprising computer executable instructions that, when executed by a processor of a vehicular communication system, facilitate performance of operations, the operations comprising:
generating positioning data corresponding to movement of a vehicle, associated with the vehicular communication system, through an environment during a time interval;
receiving, from equipment associated with a communication network operating in the environment, network data associated with the communication network;
applying the positioning data and the network data to a machine learning model, resulting in model output; and
facilitating reconfiguration of an antenna system, associated with the vehicle, from a first antenna configuration to a second antenna configuration, distinct from the first antenna configuration, based on the positioning data and the network data, the facilitating of the reconfiguration comprising selecting the second antenna configuration, from a group of antenna configurations comprising the first antenna configuration and the second antenna configuration, based on the model output and facilitating the reconfiguration of the antenna system in response to the selecting of the second antenna configuration.

15. The non-transitory machine-readable medium of claim 14, wherein the vehicle is a first vehicle, and wherein the operations further comprise:
receiving model training data from a second vehicle, distinct from the first vehicle, operating in the environment; and
training the machine learning model using the model training data.

16. The non-transitory machine-readable medium of claim 15, wherein the model training data is first model training data, and wherein the operations further comprise:
generating second model training data based on the model output; and
transferring the first model training data and the second model training data to a third vehicle, distinct from the first vehicle, operating in the environment.

17. The non-transitory machine-readable medium of claim 14, wherein the first antenna configuration is associated with a first network type selected from a group comprising a wireless local area network and a cellular network, and wherein the second antenna configuration corresponds to a second network type, selected from the group and distinct from the first network type.

18. The vehicle communication system of claim 1, wherein the first antenna configuration is associated with a first vehicle-to-everything (V2X) communication technology, and wherein the second antenna configuration is associated with a second V2X communication technology that is not the first V2X communication technology.

19. The vehicle communication system of claim 18, wherein the first V2X communication technology is an Institute of Electrical and Electronics Engineers (IEEE) 802.11p technology, and the second V2X technology is a Cellular V2X (C-V2X) technology.

20. The method of claim 10, wherein the first configuration is associated with a first vehicle-to-everything (V2X) communication technology, and wherein the second antenna configuration is associated with a second V2X communication technology that is not the first V2X communication technology.

* * * * *